UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

PHOSPHATE AND PROCESS OF MAKING THE SAME.

SPECIFICATION forming part of Letters Patent No. 446,087, dated February 10, 1891.

Application filed September 30, 1889. Serial No. 325,595. (Specimens.)

*To all whom it may concern:*

Be it known that I, JOSEPH VAN RUYMBEKE, a citizen of Belgium, residing at Chicago, in the county of Cook and State of Illinois, have invented a certain new and useful Improvement in Iron and Alumina Acid Phosphates, which is fully set forth in the following specification.

Iron and alumina acid phosphate is a well-known article of commerce, but as heretofore treated has been largely insoluble in water, or if so treated as to be soluble in water has been sticky or unduly deliquescent. It has been customary to take this phosphate and mix with it sulphuric acid, the proportion of sulphuric acid varying according to the quality or character of the phosphate used, the quantity being determined by analysis of the phosphate. If only such quantity of sulphuric acid be used as to obtain a product which would be sufficiently dry to be handled commercially, it is found to be largely insoluble in water, and therefore of small value as a fertilizer. When a larger quantity or an excess of sulphuric acid has been used to make the resultant product more largely soluble in water, it has been found that it becomes sticky or unduly deliquescent, which makes it non-commercial on that account.

My process consists of taking this phosphate after it has been treated with sulphuric acid, as heretofore, preferably using the larger proportionate quantity of sulphuric acid that has been generally used and subjecting it to a heat sufficient to give it a gray color, its natural color being red, so that the operator can readily determine by the color when sufficient heat has been applied.

The temperature which I ordinarily use is about 400° Fahrenheit, but may be carried as high as the decomposing-point of iron or alumina sulphate, which is 800°. The time to which it is submitted to this heat varies, but can best be determined by the change of color of the product. When the original phosphate analyzes forty per cent. phosphate acid, it takes about eighty per cent. of sixty-degree acid, and the product will contain thirty per cent. of phosphoric acid in the shape of metaphosphate and thirty per cent. of sulphate of iron and alumina. The metaphosphate is not soluble as such, but under the prolonged influence of the moisture of the earth when used as a fertilizer becomes acid phosphate and is soluble. When the mixture of phosphate and sulphuric acid assumes a gray color, the requisite quantity of heat has been applied, and I have found that the effect upon the product is that it is largely soluble in water and its stickiness or undue deliquescence has been substantially removed and great value is added to the product as a fertilizer.

The principal value of a fertilizer consists in its being largely soluble in water and being substantially dry and non-deliquescent, so that it can be handled commercially. These qualities are found in the product obtained by the process described above. This product is not what is known as "acid phosphate," but is a metaphosphate containing also both sulphate of iron and sulphate of alumina, as already stated. Hence I term it an "iron and alumina metaphosphate." This substance is dry and may be readily pulverized, in which condition it still remains dry and merchantable. It also possesses the quality of solubility necessary for fertilizing purposes; or, more strictly speaking, it possesses the quality of slowly changing to a soluble when brought into contact with the damp earth, as already stated, which occurs in the ordinary application of fertilizers to soils.

What I claim, and desire to secure by Letters Patent, is—

1. The process of making iron and alumina acid phosphate by first treating it with sulphuric acid and then heating it at a temperature of from 400° to 800° Fahrenheit until the acid phosphate contained therein is converted into metaphosphate, usually indicated by the product assuming a gray color, as specified.

2. As a new article of manufacture, an iron and alumina metaphosphate mixed with an iron and alumina sulphate, substantially as specified.

JOSEPH VAN RUYMBEKE.

Witnesses:
ABBIE M. BEST,
L. L. COBURN.